US012643143B2

(12) United States Patent
Burnstine-Townley et al.

(10) Patent No.: US 12,643,143 B2
(45) Date of Patent: Jun. 2, 2026

(54) MULTI-SOLVENT SYSTEM AND METHOD FOR SYNTHESIS OF NANOPARTICLES

(71) Applicant: University of Central Florida Research Foundation, Inc., Orlando, FL (US)

(72) Inventors: Alex Burnstine-Townley, Orlando, FL (US); Lei Zhai, Orlando, FL (US); Divambal Appavoo, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 280 days.

(21) Appl. No.: 18/237,218

(22) Filed: Aug. 23, 2023

(65) Prior Publication Data

US 2024/0075525 A1 Mar. 7, 2024

Related U.S. Application Data

(60) Provisional application No. 63/400,232, filed on Aug. 23, 2022.

(51) Int. Cl.
*B22F 9/24* (2006.01)
*B22F 1/054* (2022.01)
*B82Y 40/00* (2011.01)

(52) U.S. Cl.
CPC ................ *B22F 1/054* (2022.01); *B22F 9/24* (2013.01); *B82Y 40/00* (2013.01);
(Continued)

(58) Field of Classification Search
CPC ........................................................ B22F 9/24
See application file for complete search history.

(56) References Cited

U.S. PATENT DOCUMENTS

2005/0209095 A1* 9/2005 Brown ..................... B01J 23/50
502/185
2011/0203414 A1* 8/2011 Tan ........................... B22F 9/24
554/71

(Continued)

FOREIGN PATENT DOCUMENTS

TW 201201929 A * 1/2012

OTHER PUBLICATIONS

Machine translation of TW201201929A (Taiwanese document published in 2012).*

(Continued)

*Primary Examiner* — Christopher S Kessler
(74) *Attorney, Agent, or Firm* — Suiter Swantz IP

(57) ABSTRACT

A method may include coating a substrate with a solution, where the solution includes one or more metal salts and a first solvent. The one or more metal salts may be configured to dissolve in the first solvent. The method may further include adding a second solvent to the coated substrate until one or more metal salt crystals precipitate over a surface of substrate. The second solvent may include an antisolvent where the one or more metal salts of the solution are insoluble in the second solvent. The method may further include performing a microwave heating process to apply microwave heat to the substrate while the second solvent is present to induce thermal decomposition of the one or more metal salts until one or more metal nanostructures are formed on the surface of the substrate.

17 Claims, 12 Drawing Sheets

(52) U.S. Cl.
CPC ....... *B22F 2202/11* (2013.01); *B22F 2301/10* (2013.01); *B22F 2301/15* (2013.01)

(56) References Cited

U.S. PATENT DOCUMENTS

| | | | | |
|---|---|---|---|---|
| 2013/0053239 | A1* | 2/2013 | Carpenter | B22F 9/24 977/773 |
| 2018/0369771 | A1* | 12/2018 | Hu | C01B 32/198 |
| 2019/0161840 | A1* | 5/2019 | Yao | C22F 1/002 |

OTHER PUBLICATIONS

L. Yan, B. Zhang, J. Zhu, Y. Li, P. Tsiakaras, P. Kang Shen, Electronic modulation of cobalt phosphide nanosheet arrays via copper doping for highly efficient neutral-pH overall water splitting, Appl. Catal. B Environ. 265 (2020) 118555. https://doi.org/10.1016/j.apcatb.2019.118555.
J.X. Flores-Lasluisa, J. Quilez-Bermejo, A.C. Ramirez-Pérez, F. Huerta, D. CazorlaAmorós, E. Morallón, Copper-doped cobalt spinel electrocatalysts supported on activated carbon for hydrogen evolution reaction, Materials (Basel). 12 (2019). https://doi.org/10.3390/ma12081302.
Kailasa, S. K. et al. Recent progress on surface chemistry of plasmonic metal nanoparticles for colorimetric assay of drugs in pharmaceutical and biological samples. TrAC—Trends Anal. Chem. 105, 106-120 (2018).
N.A. Krapivka, S.A. Firstov, M. V. Karpets, A.N. Myslivchenko, V.F. Gorban', Features of phase and structure formation in high-entropy alloys of the AlCrFeCoNiCux system (x=0, 0.5, 1.0, 2.0, 3.0), Phys. Met. Metallogr. 116 (2015) 467-474. https://doi.org/10.1134/S0031918X15030084.
John, A. et al. Electrochemical sensors using conducting polymer/noble metal nanoparticle nanocomposites for the detection of various analytes: a review. Journal of Nanostructure in Chemistry vol. 11 (Springer Berlin Heidelberg, 2021).
Inoue, M., Hayashi, Y., Takizawa, H. & Suganuma, K. Nanoparticle Fabrication. in Nanopackaging 219-242 (Springer International Publishing, 2018). doi:10.1007/978-3-319-90362-0_7.
Xiong, H., Jewell, L. L. & Coville, N. J. Shaped Carbons as Supports for the Catalytic Conversion of Syngas to Clean Fuels. ACS Catal. 5, 2640-2658 (2015).
Liu, L. & Corma, A. Metal Catalysts for Heterogeneous Catalysis: From Single Atoms to Nanoclusters and Nanoparticles. Chem. Rev. 118, 4981-5079 (2018).
Sapi, A. et al. Metallic Nanoparticles in Heterogeneous Catalysis. Catal. Letters 151, 2153-2175 (2021).
Sharkey, B. E. & Jentoft, F. C. Fundamental Insights into Deactivation by Leaching during Rhenium-Catalyzed Deoxydehydration. ACS Catal. 9, 11317-11328 (2019).
Yao, Y. et al. Carbothermal shock synthesis of high-entropy-alloy nanoparticles. Science (80-. ). 359, 1489-1494 (2018).
Gao, S. et al. Synthesis of high-entropy alloy nanoparticles on supports by the fast moving bed pyrolysis. Nat. Commun. 11, (2020).
Shakoorioskooie, M., Menceloglu, Y. Z., Unal, S. & Hayat Soytas, S. Rapid Microwave-Assisted Synthesis of Platinum Nanoparticles Immobilized in Electrospun Carbon Nanofibers for Electrochemical Catalysis. ACS Appl. Nano Mater. 1, 6236-6246 (2018).
Zhong, G. et al. Synthesis of Metal Oxide Nanoparticles by Rapid, High-Temperature 3D Microwave Heating. Adv. Funct. Mater. 29, 1-9 (2019).
Xie, H. et al. High-Temperature Pulse Method for Nanoparticle Redispersion. J. Am. Chem. Soc. 142, 17364-17371 (2020).
Jones, D. A., Lelyveld, T. P., Mavrofidis, S. D., Kingman, S. W. & Miles, N. J. Microwave heating applications in environmental engineering—A review. Resour. Conserv. Recycl. 34, 75-90 (2002).
Sun, J., Wang, W. & Yue, Q. Review on microwave-matter interaction fundamentals and efficient microwave-associated heating strategies. Materials (Basel). 9, (2016).
Fazio, E. et al. Nanoparticles engineering by pulsed laser ablation in liquids: Concepts and applications. Nanomaterials 10, 1-50 (2020).
Jamkhande, P. G., Ghule, N. W., Bamer, A. H. & Kalaskar, M. G. Metal nanoparticles synthesis: An overview on methods of preparation, advantages and disadvantages, and applications. J. Drug Deliv. Sci. Technol. 53, 101174 (2019).
Jung, H. J. & Choi, M. Y. Specific solvent produces specific phase Ni nanoparticles: A pulsed laser ablation in solvents. J. Phys. Chem. C 118, 14647-14654 (2014).
Shigeta, M., Hirayama, Y. & Ghedini, E. Computational study of quenching effects on growth processes and size distributions of silicon nanoparticles at a thermal plasma tail. Nanomaterials 11, (2021).
Hansen, T. W., Delariva, A. T., Challa, S. R. & Datye, A. K. Sintering of catalytic nanoparticles: Particle migration or ostwald ripening? Acc. Chem. Res. 46, 1720-1730 (2013).
Yuvaraj, S., Lin, F. Y., Chang, T. H. & Yeh, C. T. Thermal decomposition of metal nitrates in air and hydrogen environments. J. Phys. Chem. B 107, 1044-1047 (2003).
Liu, Y. et al. Super heating/cooling rate enabled by microwave shock on polymeric graphene foam for high performance Lithium-Sulfur batteries. Carbon N. Y. 173, 809-816 (2021).
Chemat, F. & Esveld, E. Microwave super-heated boiling of organic liquids: Oigin, effect and application. Chem. Eng. Technol. 24, 735-744 (2001).
Fardad, D. & Ladommatos, N. Evaporation of hydrocarbon compounds, including gasoline and diesel fuel, on heated metal surfaces. Proc. Inst. Mech. Eng. Part D J. Automob. Eng. 213, 625-644 (1999).
Hnizdil, M. et al. Prediction of Leidenfrost Temperature in Spray Cooling for Continuous Casting and Heat Treatment Processes. Metals (Basel). 10, 1551 (2020).
Paek, S. et al. From Nano- to Micrometer Scale: The Role of Antisolvent Treatment on High Performance Perovskite Solar Cells. Chem. Mater. 29, 3490-3498 (2017).
Dubey, S. K. et al. Emerging trends of nanotechnology in advanced cosmetics. Colloids Surfaces B Biointerfaces 214, 112440 (2022).
Xiao, M. et al. A fast deposition-crystallization procedure for highly efficient lead iodide perovskite thin-film solar cells. Angew. Chemie—Int. Ed. 53, 9898-9903 (2014).
Behafarid, F. & Roldan Cuenya, B. Towards the understanding of sintering phenomena at the nanoscale: Geometric and environmental effects. Top. Catal. 56, 1542-1559 (2013).
Menon, S. K., Boettcher, P. A., Ventura, B. & Blanquart, G. Hot surface ignition of n-hexane in air. Combust. Flame 163, 42-53 (2016).
Li, D. & Zhao, Y. Understanding the chain mechanism of radical reactions in n-hexane pyrolysis. Res. Chem. Intermed. 41, 3507-3529 (2015).
Nine, M. J., Munkhbayar, B., Rahman, M. S., Chung, H. & Jeong, H. Highly productive synthesis process of well dispersed Cu2O and Cu/Cu2O nanoparticles and its thermal characterization. Mater. Chem. Phys. 141, 636-642 (2013).
Panapoy, M., Dankeaw, A. & Ksapabutr, B. Electrical Conductivity of PAN-based Carbon Nanofibers Prepared by Electrospinning Method. Thammasat Int . J . Sc . Tech 13, 11-17 (2008).
Biesinger, M. C., Lau, L. W. M., Gerson, A. R. & Smart, R. S. C. Resolving surface chemical states in XPS analysis of first row transition metals, oxides and hydroxides: Sc, Ti, V, Cu and Zn. Appl. Surf. Sci. 257, 887-898 (2010).
Lee, M. W., Haniff, M. A. S. M., Teh, A. S., Bien, D. C. S. & Chen, S. K. Effect of Co and Ni nanoparticles formation on carbon nanotubes growth via Pecvd. J. Exp. Nanosci. 10, 1232-1241 (2015).
Kumar, M. Carbon Nanotube Synthesis and Growth Mechanism. in Carbon Nanotubes—Synthesis, Characterization, Applications (InTech, 2011). doi:10.5772/19331.
Lee, S. J., Theerthagiri, J. & Choi, M. Y. Time-resolved dynamics of laser-induced cavitation bubbles during production of Ni nanoparticles via pulsed laser ablation in different solvents and their electrocatalytic activity for determination of toxic nitroaromatics. Chem. Eng. J. 427, 130970 (2022).

(56) References Cited

OTHER PUBLICATIONS

Douka, A. I. et al. Transition metal/carbon hybrids for oxygen electrocatalysis in rechargeable zinc-air batteries . EcoMat 3, 1-18 (2021).
Bolokang, A. S. & Phasha, M. J. Novel synthesis of metastable HCP nickel by water quenching. Mater. Lett. 65, 59-60 (2011).
Anderson, C. R., Lee, R. N., Morar, J. F. & Park, R. L. Comparison of Aps and Fresca Core Level Binding Energy Measurements. J. Vac. Sci. Technol. 20, 617-621 (1981).
Chung Ping Li, Proctor, A. & Hercules, D. M. Curve fitting analysis of esca Ni 2p spectra of nickel-oxygen compounds and Ni/Al2O3 catalysts. Appl. Spectrosc. 38, 880-886 (1984).
Prieto, P. et al. XPS study of silver, nickel and bimetallic silver-nickel nanoparticles prepared by seed-mediated growth. Appl. Surf. Sci. 258, 8807-8813 (2012).
Hu, X., Björkman, T., Lipsanen, H., Sun, L. & Krasheninnikov, A. V. Solubility of Boron, Carbon, and Nitrogen in Transition Metals: Getting Insight into Trends from First-Principles Calculations. J. Phys. Chem. Lett. 6, 3263-3268 (2015).
Bernardin, J. D. & Mudawar, I. A cavity activation and bubble growth model of the Leidenfrost point. J. Heat Transfer 124, 864-874 (2002).
Guichet, V., et al. Thermal Science and Engineering Progress 13 (2019): 100384.
N.A. Krapivka, S.A. Firstov, et al. Phys. Met. Metallogr. 116 (2015) 467-474.
K. Joshi, M.I. Arefev, L. V. Zhigilei, Generation and characterization of carbon fiber microstructure in atomistic simulations, Carbon N. Y. 152 (2019) 396-408. https://doi.org/10.1016/j.carbon.2019.06.014.
Liu, Y., Zhai, Y., Xia, Y., Li, W. & Zhao, D. Recent Progress of Porous Materials in Lithium-Metal Batteries. Small Struct. 2, 2000118 (2021).
G.H. An, E.H. Lee, H.J. Ahn, Well-dispersed iron nanoparticles exposed within nitrogendoped mesoporous carbon nanofibers by hydrogen-activation for oxygen-reduction reaction, J. Alloys Compd. 682 (2016) 746-752. https://doi.org/10.1016/j.jallcom.2016.05.033.
I.J. Markel, J. Glaser, M. Steinbrück, H.J. Seifert, Experimental and computational analysis of PSZ 10- and PSZ 20-derived Si—C—N ceramics, J. Eur. Ceram. Soc. 39 (2019) 195-204. https://doi.org/10.1016/j.jeurceramsoc.2018.08.045.
Q. Wen, Z. Yu, R. Riedel, The fate and role of in situ formed carbon in polymer-derived ceramics, Prog. Mater. Sci. 109 (2020) 100623. https://doi.org/10.1016/j.pmatsci.2019.100623.
Amanda Morris, “Forever chemicals” destroyed by simple new method; Aug. 18, 2022; https://news.northwestern.edu/stories/2022/08/forever-chemicals-destroyed-by-simple-new-method/.
J. Hwang, Y.Y. Li Sip, K.T. Kim, G. Han, K.L. Rodriguez, D.W. Fox, S. Afrin, A. Burnstine Townley, L. Zhai, W.H. Lee, Nanoparticle-embedded hydrogel synthesized electrodes for electrochemical oxidation of perfluorooctanoic acid (PFOA) and perfluorooctanesulfonic acid (PFOS), Chemosphere. 296 (2022) 134001. https://doi.org/10.1016/j.chemosphere.2022.134001.
J. Quinson, K.M.Ø. Jensen, From platinum atoms in molecules to colloidal nanoparticles : A review on reduction , nucleation and growth mechanisms, Adv. Colloid Interface Sci. 286 (2021) 102300. https://doi.org/10.1016/j.cis.2020.102300.
V. Guichet, S. Almahmoud, H. Jouhara, Nucleate pool boiling heat transfer in wickless heat pipes ( two-phase closed thermosyphons ): A critical review of correlations, Therm. Sci. Eng. Prog. 13 (2019) 100384. https://doi.org/10.1016/j.tsep.2019.100384.

* cited by examiner

400

410

430

420

510

500

530

520

610

600

710

700

810

830

800

820

MULTI-SOLVENT SYSTEM AND METHOD FOR SYNTHESIS OF NANOPARTICLES

CROSS-REFERENCE TO RELATED APPLICATIONS

The present application claims the benefit under 35 U.S.C. § 119 of U.S. Provisional Application Ser. No. 63/400,232, filed on Aug. 23, 2022, entitled MULTI-SOLVENT SYSTEM AND METHOD FOR SYNTHESIS OF NANOPARTICLES, naming Alex Burnstine-Townley, Lei Zhai, and Divambal Appavoo as inventors, which is incorporated herein by reference in the entirety.

TECHNICAL FIELD

The present disclosure is directed generally to nanoparticle synthesis and, more particularly, to a multi-solvent system and method for microwave synthesis of nanoparticles.

BACKGROUND

Supported nanoparticle composites serve a vital role in a wide range of chemical applications (e.g., catalysis, pharmaceuticals, cosmetics, electronics, optical sensors, energy storage, energy conversion, pollutant degradation, and the like). Existing methods require close contact of heated rods to apply high heat to a substrate and require inert atmosphere to prevent burning. Additionally, existing methods apply heat without liquid which results in the production of metal aggregates that diminish nanoparticle utility. There is therefore a need to develop systems and methods to cure the above deficiencies.

SUMMARY

A method is disclosed, in accordance with one or more embodiments of the present disclosure. In embodiments, the method includes coating a substrate with a solution. The solution includes one or more metal salts and a first solvent, where the one or more metal salts are configured to dissolve in the first solvent. In embodiments, the method includes adding a second solvent to the coated substrate until one or more metal salt crystals precipitate over a surface of substrate. The second solvent includes an antisolvent where the one or more metal salts of the solution are insoluble in the second solvent. In embodiments, the method includes performing a microwave heating process to apply microwave heat to the substrate while the second solvent is present to induce thermal decomposition of the one or more metal salts until one or more metal nanostructures are formed on the surface of the substrate.

A metal nanostructure is disclosed, in accordance with one or more embodiments of the present disclosure. In embodiments, the metal nanostructure is prepared by a process including the step of coating a substrate with a solution. The solution includes one or more metal salts and a first solvent, where the one or more metal salts are configured to dissolve in the first solvent. In embodiments, the metal nanostructure is prepared by a process including the step of adding a second solvent to the coated substrate until one or more metal salt crystals precipitate over a surface of substrate. The second solvent includes an antisolvent where the one or more metal salts of the solution are insoluble in the second solvent. In embodiments, the metal nanostructure is prepared by a process including the step of performing a microwave heating process to apply microwave heat to the substrate while the second solvent is present to induce thermal decomposition of the one or more metal salts until one or more metal nanostructures are formed on the surface of the substrate.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
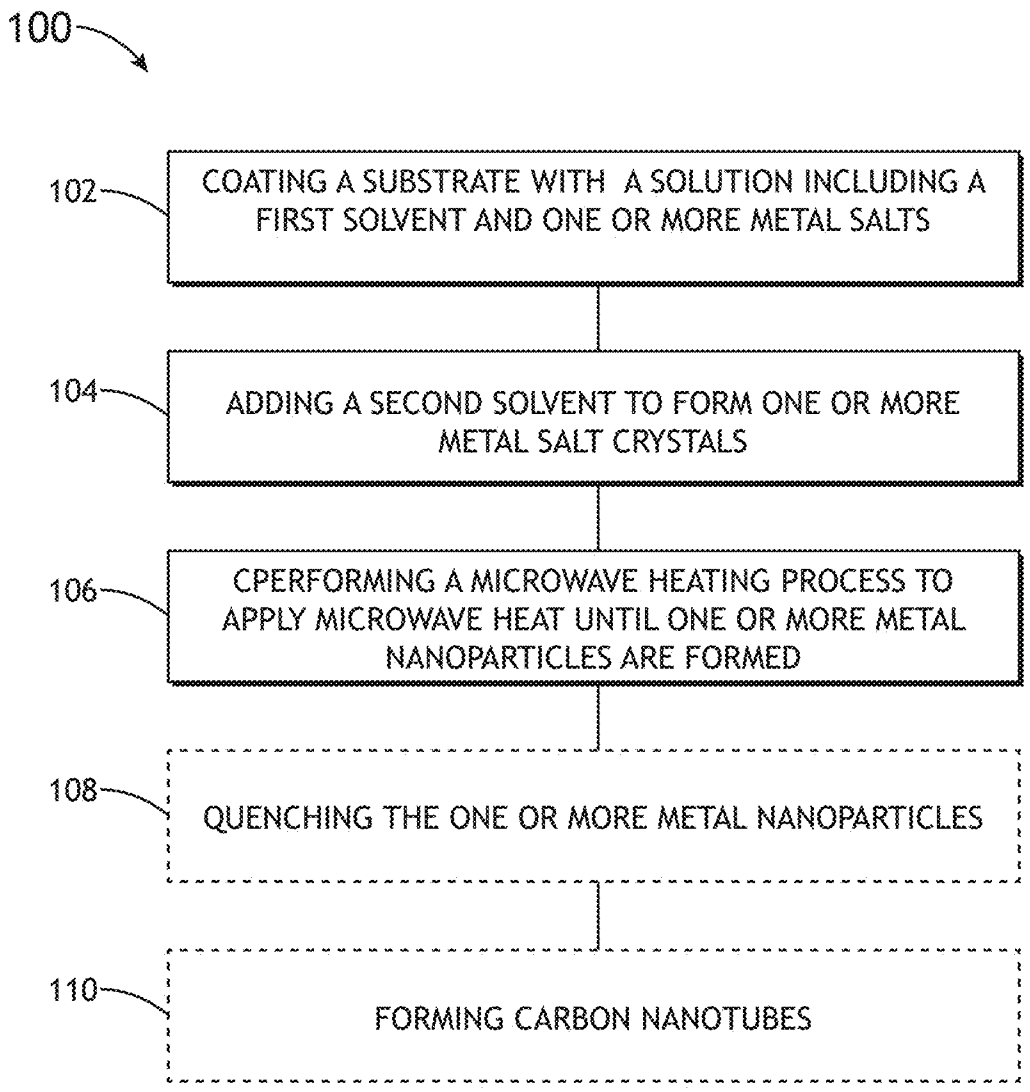
FIG. 1 is a flow diagram depicting a multi-solvent method for microwave synthesis of nanoparticles, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a multi-solvent system and method for synthesis of nanoparticles. In some embodiments, the system and method may use an antisolvent precipitation technique using two or more solvents to deposit one or more metal salt particles onto a surface of a substrate. Further, in some embodiments, the system and method may perform a microwave heating process (e.g., a thermal shock process) following the antisolvent precipitation technique to produce metal nanostructures (e.g., nanoparticles, nano flakes, or nanorods) on a surface of the substrate.

It is contemplated herein that the system and method disclosed herein may provide many benefits and are suitable for a wide variety of applications. For example, traditional techniques may remove the solvent(s) prior to subsequent treatments and/or require inert atmosphere to prevent burning. This results in poor outcomes, such as formation of metal aggregates which diminishes the utility of the nanoparticles (e.g., decreased surface area and thus a worse catalyst). Further, inert atmosphere makes it more difficult for scalability and is more expensive. In contrast, in some embodiments, the system and method disclosed herein may apply a microwave heating process (e.g., via a microwave carbothermal shock process) to the substrate with the presence of the two or more solvents. As a result, the system and method may produce nanoparticles, rather than oxides, under ambient atmosphere (without the need for inert atmosphere) to expand the list of possible composite materials (e.g., any mix of elements in any ratio). Further, the system and method may reduce nanoparticle size to improve atomic efficiency of selected element(s). Additionally, the system and method may simplify the entire manufacturing process by excluding the need for separate drying steps due to the presence of solvents during the heating process. For example, traditional techniques may use separate drying steps which results in larger aggregates (e.g., >100 nm), sparse coverage, and/or poor reproducibility (e.g., sample burning, drying method dependent results, etc.). Further, the system and method may significantly improve the scalability of carbon fiber/nanoparticle composites, thereby rendering the process much more valuable if costs of production can be mitigated. Further, the system and method may be readily added to the existing roll-to-roll carbon fiber manufacturing process. Further, the system and method may be readily scalable to mass production level for application in fuel cell electrocatalysts, energy storage, sensing devices, and the like.

The system and method disclosed herein may utilize any type of substrate. In some embodiments, a substrate may include a carbon-based substrate. For example, the carbon-based substrate may include a carbon fiber substrate. By way of another example, the carbon-based substrate may include a graphene substrate. In some embodiments, a substrate may include a metal or metal oxide substrate. For example, the metal or metal oxide substrate may include, but is not limited to, nickel mesh, alumina, or the like. In some embodiments, a substrate may include a powdered substrate.

The system and method disclosed herein may utilize any antisolvent precipitation technique using two or more solvents. In some embodiments, the two or more solvents may include a metal salt solution (e.g., a solution including a first solvent/metal salt mixture) and at least a second solvent, where the one or more metal salts may be dissolved in the first solvent and the resulting solution may then be mixed with an antisolvent (i.e., a solvent that the one or more metal salts are insoluble in) until metal salt crystals precipitate homogeneously over a surface of the substrate. It is contemplated that the antisolvent precipitation technique may ensure a well dispersed coating in a rapid manner.

The system and method disclosed herein may utilize any type and amount of metal salt solution with the antisolvent precipitation technique. In some embodiments, the metal salt solution may include one or more metal salts including (1) a metal cation such as, but not limited to, one or more transition metals (e.g., nickel, cobalt, copper, and the like), one or more lanthanides (e.g., lanthanum, cerium, praseodymium, and the like), or the like, and (2) an anion such as, but not limited to, nickel nitrate, nickel chloride, nickel bromide, sulfate, acid phosphates, acetate, or the like. For example, the metal salt may include nickel nitrate. In some embodiments, the solvent used in the metal salt solution may include, but is not limited to, ethanol, propanol, methanol, butanol, pentanol, hexanol, heptanol, octanol, nonanal, decanol, tetrahydrofuran, and the like.

The system and method disclosed herein may utilize any type and amount of antisolvent that is chemically compatible with the metal salt solvent solution used in the antisolvent precipitation technique (e.g., where the one or more metal salts are soluble in the first solvent but not in the second solvent). In some embodiments, the antisolvent may include, but is not limited to, hexane, benzene, toluene, heptane, acetone, dichloromethane, diethyl ether, methyl ethyl ketone, ethyl acetate, and the like. In a non-limiting example, when hexane is used as the antisolvent, it is contemplated that hexane may be miscible with ethanol (first solvent). Further, it is contemplated that the metal salt may be soluble in ethanol (first solvent) but not soluble in hexane (second solvent). As a result, the antisolvent hexane may decrease the solubility of the metal salt until metal salt crystals precipitate homogeneously over the substrate.

Further, it is contemplated herein that the antisolvent may be non-polar (i.e., equal sharing of electrons between atoms that are covalently bonded), such that the sample maintains integrity during heating (e.g., does not absorb microwave radiation, is not subsequently heated, etc.). For example, it was observed during single solvent method control experiments that solvents having lower dipole moments (D) exhibited greater sample integrity. For example, Table 1 depicts the results of the control experiment, where excellent sample integrity is defined as 100% of the sample is intact, moderate sample integrity is defined as >50%-<100% of the sample is intact, and poor sample integrity is defined as <50% of the sample is intact. As illustrated by Table 1, hexane having zero dipole moments exhibited excellent sample integrity (e.g., 100% intact). For example, it was observed that microwave irradiation would not only be absorbed into the conductive carbon nanofiber mats, but also into these polar solvents. The lowest dipole solvent tested, hexane, was found to maintain sample integrity in all trials as it characteristically does not absorb microwave radiation nor is subsequently heated. The hot carbon fiber is well in excess of the Leidenfrost temperature of hexane (~180° C.)[27], and thus produces film boiling across the surface. This film boiling exerts minuscule force on the surface of the fiber, by forming a protective vapor blanket over its surface.

TABLE 1

| Single Solvent | Sample Integrity | Dipole Moment (D) |
|---|---|---|
| Hexane | Excellent | 0 |
| Isopropyl Alcohol | Moderate | 1.7 |
| Ethanol | Moderate | 1.7 |
| Water | Poor | 1.8 |
| Acetone | Poor | 2.9 |
| Methanol | Poor | 2.9 |
| Acetonitrile | Poor | 3.5 |

The system and method disclosed herein may utilize any type of microwave heating process suitable for decomposing the one or more metal salts into their elemental forms to form one or more metal nanoparticles on the surface of the substrate. Such a microwave heating process may provide rapid microwave heat at a sufficiently high temperature for a sufficiently short time duration such that the one or more metal salts may decompose into their respective elemental forms. Such a process may be characterized as a rapid, high-temperature heating process. For example, the microwave heating process may include, but is not limited to, a remote microwave carbothermal shock process. For instance, the microwave carbothermal shock process may apply microwave heat (e.g., 300 MHz-300 GHz) using a microwave oven (e.g., a 1000 W microwave oven).

Conventional heating techniques such as ovens utilize work by heating up the air inside the oven, such that the carbon fibers are brought near the heat source and the solvents may evaporate during heating. As such, it is contemplated that microwave heating is fast, uniform, and energetically efficient because it delivers heat to the material remotely via molecular interaction with the electromagnetic field (i.e., the carbon fibers absorb the microwaves causing electrons to vibrate and produce heat from within the carbon fiber, which heats the carbon fiber from the inside out). In some embodiments, rapid, high-temperature heat may be applied by passing an electric current (e.g., through an electrically-conductive substrate).

The system and method disclosed herein may apply heat using the microwave heating process for any length of time. Such a process may include an induction period and a Joule heating period. During the Joule heating period the substrate may glow red to bright white with gray body radiation. For example, the microwave heating process (e.g., microwave carbothermal shock) may be applied for five seconds. In one instance, the microwave heating process may include three seconds of induction and two seconds of Joule heating. In another instance, the microwave heating process may include three seconds of induction and one second of Joule heating.

It is further contemplated that the system and method disclosed herein may produce a wide range of metal or metal alloy nanostructures, where each may exhibit different characteristics. In some embodiments, the system and method may produce any high entropy metal alloy that relies on rapid heating and cooling processes. For example, cobalt may produce nanoparticles that are smaller than provided using typical techniques (e.g., nanoparticles with a diameter of approximately 5 nanometers (nm)). By way of another example, copper may produce larger nanoparticles (e.g., nanoparticles with a diameter of approximately 30 nm). By way of another example, nickel may further catalyze to produce carbon nanotubes.

Figure 2:
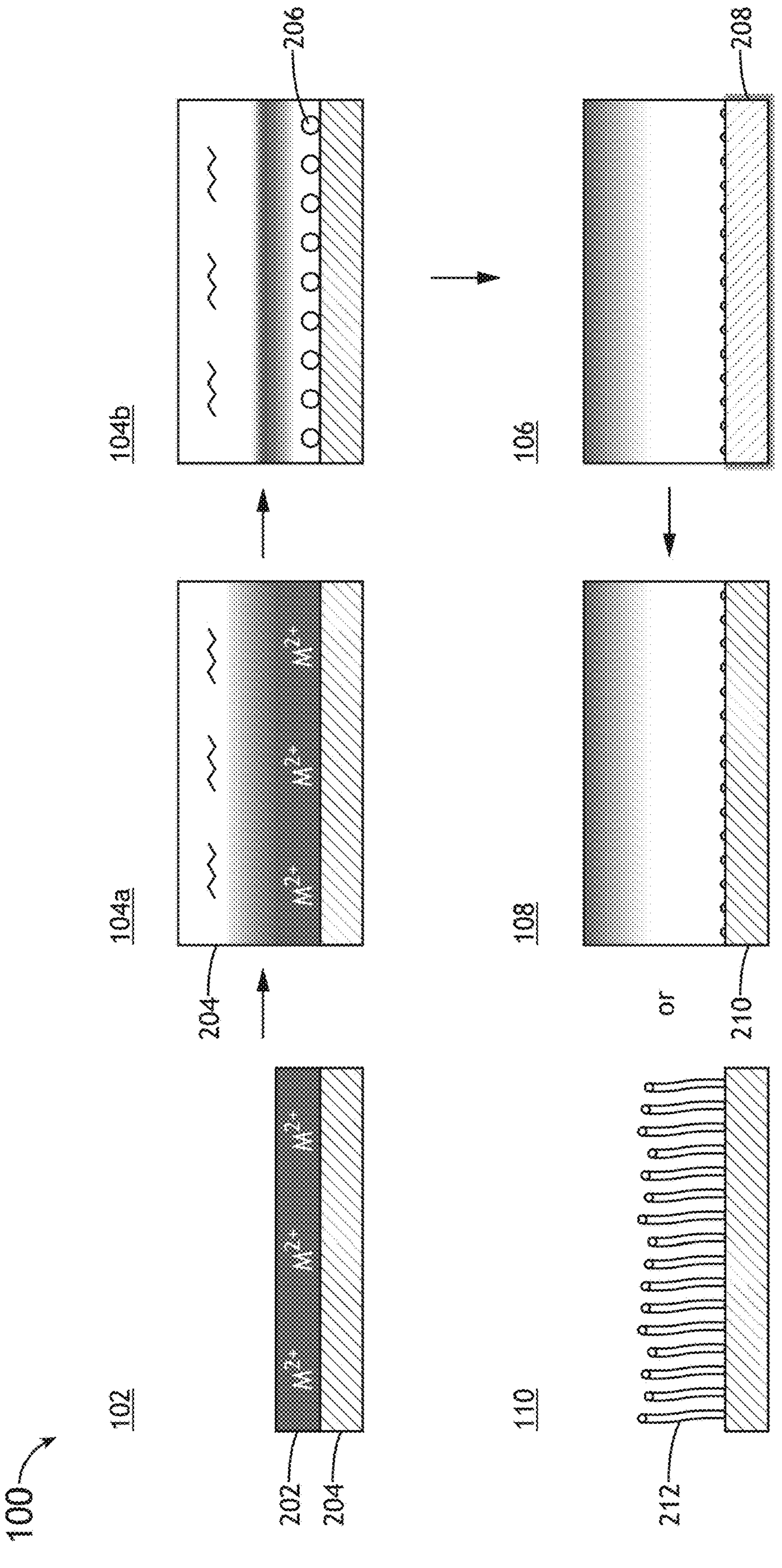
FIG. 2 is a schematic view of a multi-solvent system for microwave synthesis of nanoparticles, in accordance with one or more embodiments of the present disclosure.

FIG. 1 is a flow diagram depicting a multi-solvent method 100 for microwave synthesis of nanoparticles, in accordance with one or more embodiments of the present disclosure. FIG. 2 is a schematic diagram of a multi-solvent system for microwave synthesis of nanoparticles, in accordance with one or more embodiments of the present disclosure.

In a step 102, a substrate may be coated with a solution including a first solvent and one or more metal salts, where the one or more metal salts may be dissolved in the first solvent. In embodiments, the substrate may include a carbon-based substrate, such as a carbon fiber substrate. For example, as shown in FIG. 2, the carbon fiber substrate 200 may be coated with a first solvent solution 202. In one instance, the carbon fiber substrate 200 may be coated with an ethanolic (EtOH) nickel nitrate ($Ni(NO_3)_2$) solution 202, where the nickel nitrate ($Ni(NO_3)_2$) may be dissolved in ethanol (EtOH).

It is noted that the first solvent may be applied using any technique such as, but not limited to, submersion, spraying, or like. For example, in a non-limiting example, the carbon fiber substrate 200 (e.g., a 1×1.5 cm mat of carbon nanofibers) may be dipped into the ethanolic (EtOH) nickel nitrate ($Ni(NO_3)_2$) solution 202 (e.g., 0.05 M or 0.2 M solution of ethanolic (EtOH) nickel nitrate ($Ni(NO_3)_2$)) for a predetermined amount of time (e.g., 5 seconds). In another instance, the carbon fiber substrate 200 may be coated with an ethanolic (EtOH) cobalt nitrate ($Co(NO_3)_2$) solution 202, where the cobalt nitrate ($Co(NO_3)_2$) may be dissolved in ethanol (EtOH). In another instance, the carbon fiber substrate 200 may be coated with an ethanolic (EtOH) copper nitrate ($Cu(NO_3)_2$) solution 202, where the copper nitrate ($Cu(NO_3)_2$) may be dissolved in ethanol (EtOH).

In a step 104, the coated substrate (from step 102) may be washed in a second solvent (step 104*a*) until metal salt crystals are formed on a surface of the substrate (step 104*b*). For example, the second solvent may be any antisolvent where the one or more metal salts are soluble in the first solvent but not in the second solvent.

It is noted that the second solvent may be applied using any technique such as, but not limited to, submersion, spraying, or like For instance, as shown in FIG. 2, the carbon fiber substrate 200 including the first solvent 202 may be washed with the second solvent 204 (step 104*a*) until metal salt crystals precipitate homogeneously over the surface of the carbon fiber substrate 200 (step 104*b*). In this instance, the carbon fiber substrate 200 including the ethanolic nickel nitrate solution 202 may be washed with a reservoir of hexane (e.g., 0.1 mL of hexane) until nickel nitrate crystals 206 precipitate homogeneously over the surface of the carbon fiber substrate 200. In this regard, in a non-limiting example, a reservoir of approximately 3 mm deep of hexane may be used to wash the carbon fiber substrate 200. In another instance, the carbon fiber substrate 200 including the ethanolic cobalt nitrate solution 202 may be washed with hexane until cobalt nitrate crystals 206 precipitate homogeneously over the surface of the carbon fiber substrate 200. In another instance, the carbon fiber substrate 200 including the ethanolic copper nitrate solution 202 may be washed with hexane until copper nitrate crystals 206 precipitate homogeneously over the surface of the carbon fiber substrate 200.

Although steps 102-104 contemplate "washing" the substrate with the one or more solvents (e.g., first solvent and second solvent/antisolvent), it is contemplated herein that the substrate may be "sprayed" with the one or more solvents (e.g., first solvent and/or second solvent/antisolvent). For example, the substrate may be sprayed with the first solvent and then sprayed with the second solvent (antisolvent).

It is contemplated that the solvents afford several other changes to morphological and mechanistic outcomes, in addition to the change in heating mechanism and concentration profile. For example, the presence of solvent during microwave heating can preserve carbon nanofiber mat integrity by altering the atmosphere about the mat. As previously noted, high temperatures combined with ambient oxygen can lead to burning of the carbon. Conventional Joule heating uses inert atmosphere to hinder burning. However, inclusion of an appropriate solvent may afford protection similar to that of the nitrogen. As discussed, a vapor blanket is dynamically formed by solvent film boiling over the surface of the heated carbon nanofibers. This allays sample burning by displacement of oxidative ambient air with an excess of hexane to afford a fuel-rich atmosphere incapable of combustion during the short reaction time.

In a step 106, heat may be applied, via a microwave heating process, to the carbon fiber substrate 200 and the metal salt crystals 206 while at least one of the first solvent 202 or the second solvent 204 are present until one or more metal nanoparticles are formed on a surface of the carbon fiber substrate. For example, microwave heat may be applied for a predetermined amount of time using a microwave carbothermal shock process until the one or more metal salts are thermally decomposed into their elemental forms to yield liquid metal droplets and the metal nanoparticles are formed on the surface of the carbon fiber substrate 200. Continuing with the above example, the carbon fiber substrate 200 and the metal salt crystals 206 in the reservoir of hexane may be heated using microwave carbothermal shock 208 for five seconds (e.g., 3 seconds induction and 2 seconds Joule heating) until the one or more metal salts are thermally decomposed into their elemental forms to yield liquid metal droplets. For instance, in this non-limiting example, the reservoir of hexane liquid may thermally decompose into hydrocarbons, adsorbed carbon species, and hydrogen (Equation 1) during Joule heating, where the hydrogen may serve as a reductant to form metallic nanoparticles (e.g., nickel nanoparticles), rather than metal oxides, during the thermal decomposition of the metal nitrates (Equation 2). The side-product gases may be expelled from the sample, leaving metallic nanoparticles adhered to the surface of the carbon nanofiber.

(Equation 1)

$$C_6H_{12} \xrightarrow{\Delta} C_xH_y + C^* + H_2$$

(Equation 2)

$$M(NO_3)_2 + 9\,H_2 \xrightarrow{\Delta} M(l) + 2\,NH_3 + 6\,H_2O$$

Figure 3B:
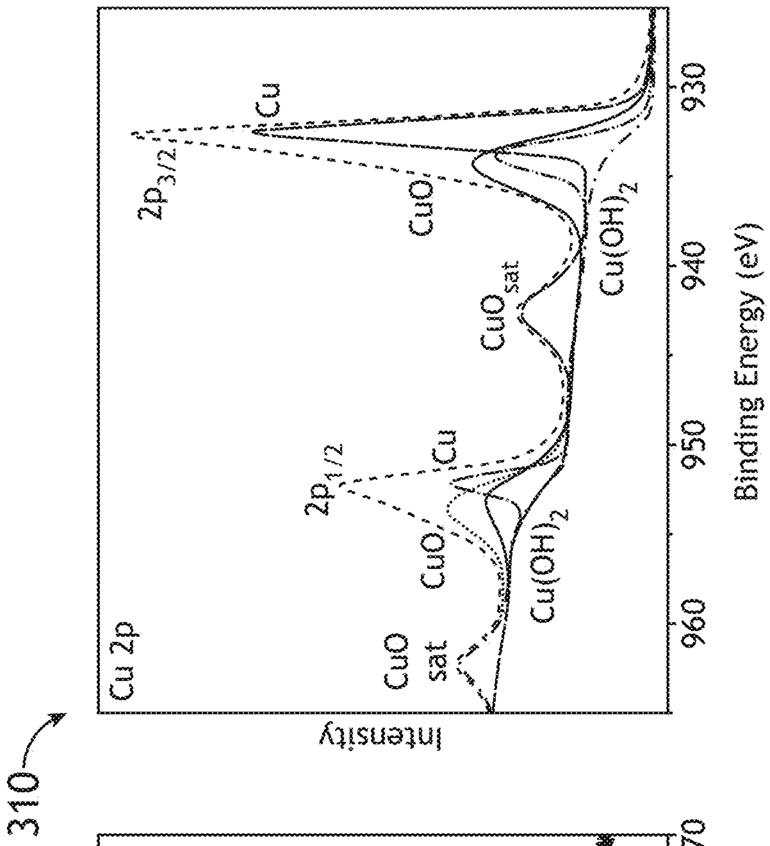
FIG. 3B is an x-ray photoelectron (XPS) graph, in accordance with one or more embodiments of the present disclosure.
Figure 3A:
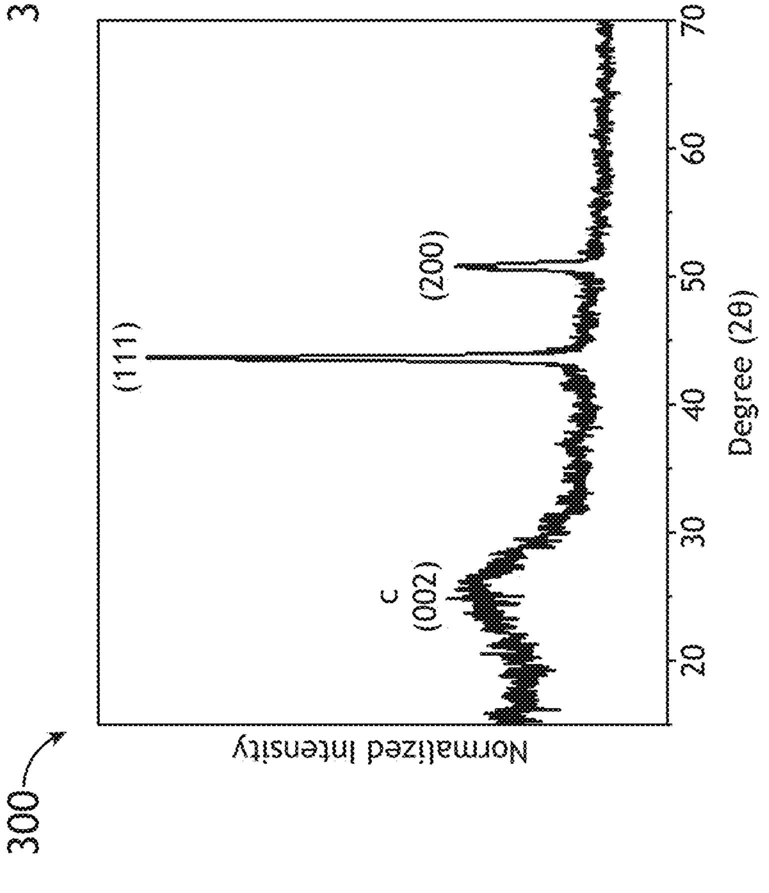
FIG. 3A is an x-ray diffraction (XRD) graph, in accordance with one or more embodiments of the present disclosure.

FIGS. 3A-3B illustrate characterization graphs that confirm the predominance of metallic nanoparticles, in accordance with Equations 1-2 above. For example, the x-ray diffraction (XRD) graph 300 depicts a dual-solvent fabricated deposit showing metallic nanoparticles. For instance, CNF-Cu shows metallic face-centered cubic (fcc) peaks at 43.6° (111) and 50.7° 2θ (200); in addition, the carbon nanofiber peak appears at 25.4° (002).

Further, the x-ray photoelectron spectroscopy (XPS) graph 310 depicts a dual-solvent fabricated deposit showing metallic nanoparticles, similar to graph 300 although graph 310 shows additional oxide peaks present. For instance, CNF-Cu shows a mix of the metallic and oxide states with the strong $2p_{3/2}$ metallic Cu peak at 932.65 eV, CuO peak at 933.89 eV, and $Cu(OH)_2$ at 934.32 eV, in addition, the CuO satellite appears at 942.75 eV. The $2p_{1/2}$ displays the accompanying Cu metal peak at 952.44 eV, CuO at 952.92 eV, $Cu(OH)_2$ at 953.61 eV, and the CuO satellite at 962.58.36 eV.

It is contemplated that some degree of nanoparticle oxidation, with CuO and $Cu(OH)_2$ formation, may be expected and is more pronounced when probed using XPS (graph 310), with a shallow photoelectron escape depth of 5 nm, as compared to XRD (graph 300) with X-ray penetration of over 1 μm.

In a step 108, the substrate 200 including the metal nanoparticles may be quenched. For example, the carbon fiber substrate 200 including the metal nanoparticles may be quenched using at least one of the first solvent 202 or the second solvent 204. For instance, the hexane antisolvent 204 may be used to quench the substrate 200 including the one or more metal nanoparticles. In this regard, the cooling rate of the substrate 200 may be controlled using the hexane solvent 204, such that small, well dispersed metal nanoparticles 210 are formed on the surface of the substrate 200.

It is contemplated that the small, well dispersed metal nanoparticles 210 formed on the surface of the substrate 200 may be spherical in shape. Further, the metal nanoparticles may be between approximately 0 nm and 60 nm. For example, the metal nanoparticles may be between approximately 5 nm and 40 nm. For instance, the metal nanoparticles may be approximately 15.4 nm. The metal nanoparticles may have an interparticle distance (or spacing) between approximately 0 nm and 100 nm. For example, the metal nanoparticles may have an interparticle distance between approximately 15 nm and 100 nm. For instance, the metal nanoparticles may have an interparticle distance of approximately 20 nm. It is noted that the size and shape of the metal nanoparticles may vary based on the elements used and the concentration of the solvents. As such, adjusting the concentration (and/or elements) may be used to tailor the desired nanoparticle size.

As previously discussed, it is contemplated that the solvent affects rapid thermal quenching to temperatures low enough to halt nanoparticle growth and coalescence migration to result in small, well-dispersed nanoparticles deposited onto the carbon fiber support. These observations show the vital role of the solvent to change the cooling mechanism, especially given the limited temporal control of the conventional microwave. It is noted that conventional techniques may form large metal nanoparticles. For example, single solvent methods may form large nanoparticles (117±56.8 nm nanoparticles) and conventional heating methods may form large nanoparticles (56.8±7.3 nm nanoparticles).

Figure 4A:
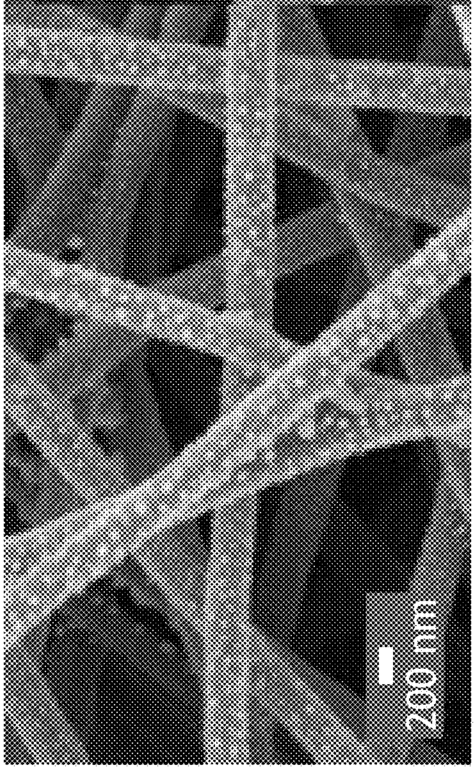
FIG. 4A is a scanning electron microscopy (SEM) image depicting copper nanoparticles formed using the multi-solvent method, in accordance with one or more embodiments of the present disclosure.
Figure 4B:
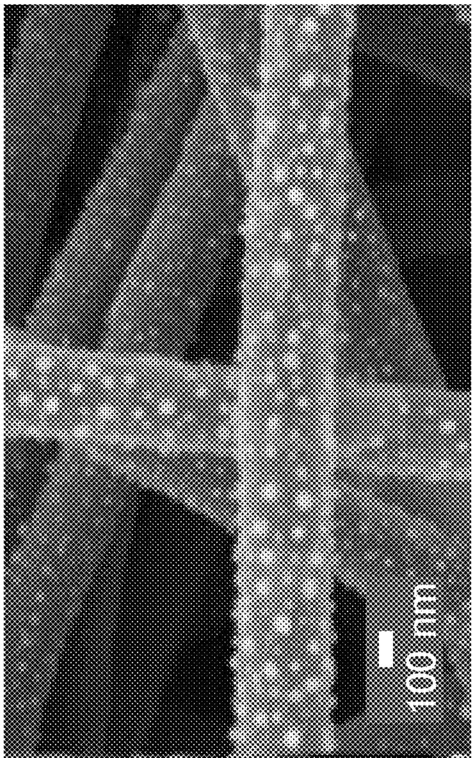
FIG. 4B is an SEM image depicting copper nanoparticles formed using the multi-solvent method, in accordance with one or more embodiments of the present disclosure.
Figure 4D:
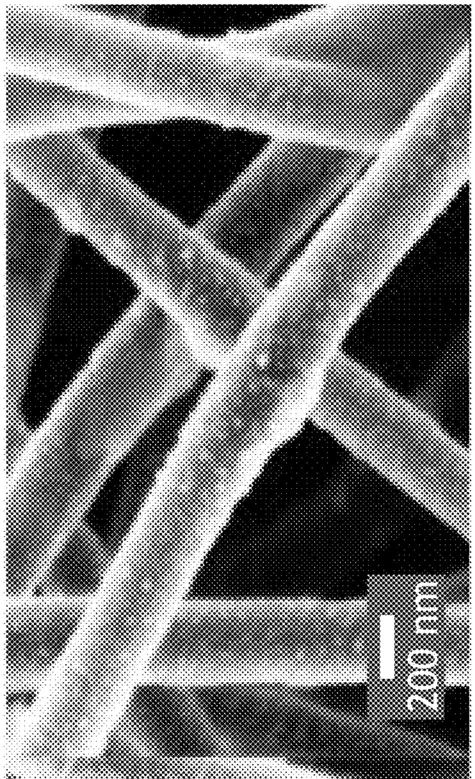
FIG. 4D is an SEM image depicting cobalt nanoparticles formed using the multi-solvent method, in accordance with one or more embodiments of the present disclosure.
Figure 4C:
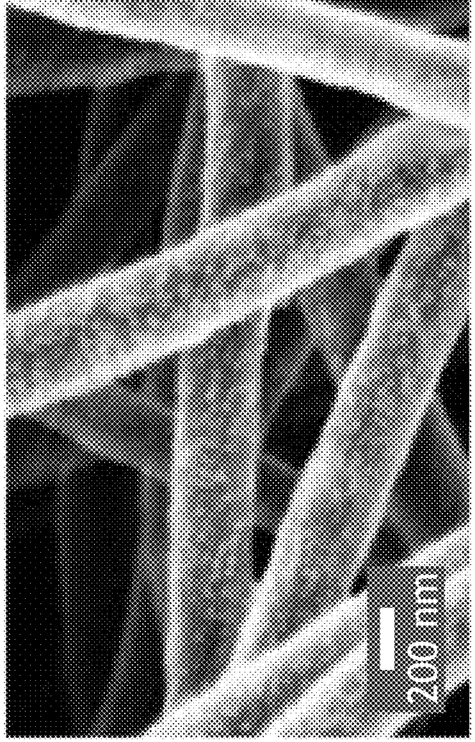
FIG. 4C is an SEM image depicting cobalt nanoparticles formed using the multi-solvent method, in accordance with one or more embodiments of the present disclosure.

FIGS. 4A-4D illustrate SEM images depicting metallic nanoparticles formed using the dual-solvent method of the present disclosure. For example, FIGS. 4A-4B are SEM image 400, 410 depicting copper nanoparticles (Cu-CNF) formed on the substrate using the dual-solvent method of the present disclosure. For instance, FIGS. 4A-4B depict small, dispersed Cu-CNFs formed, where the Cu-CNFs are approximately 18.5 nm±4.4 nm. By way of another example, FIGS. 4C-4D are SEM images 420, 430 depicting cobalt nanoparticles (Co-CNF) formed on the substrate using the dual-solvent method of the present disclosure. For instance, FIGS. 4C-4D depict small, dispersed Co-CNFs formed, where the Co-CNFs are approximately 9.5 nm±1.6 nm.

Depending on the catalytic activity of the elemental species and concentration present, in a step 110, carbon nanotubes may be formed. For example, where the one or more metal salts include a metal cation such as nickel, the nickel nanoparticles catalyzed in step 106 may catalyze further reactions with available atmospheric pressure to produce carbon nanotubes 212.

It is noted that nickel nanoparticles may catalyze the formation of carbon nanotubes with the presence of hydrocarbon sources. For example, nickel nanoparticles produced in the microwave heating process (e.g., microwave carbothermal shock process, or the like) may catalyze the formation of carbon nanotubes due to the presence of hydrocarbons at the high temperature.

Figure 5B:
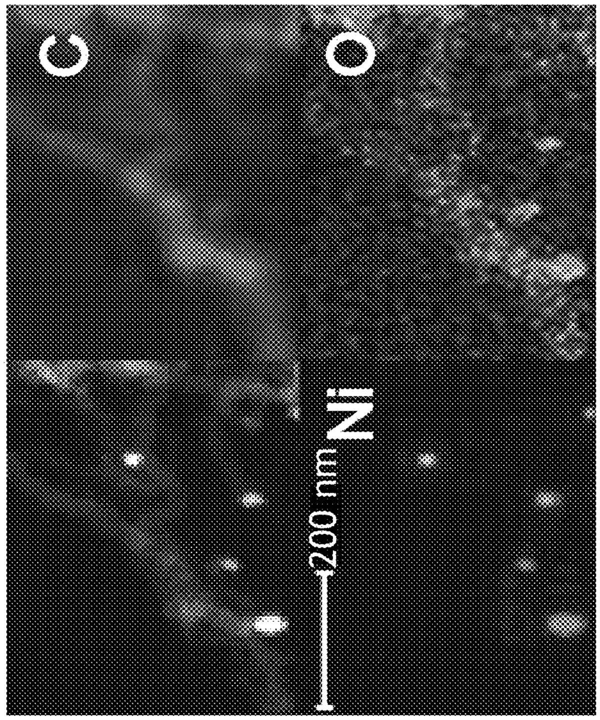
FIG. 5B is a transmission electron microscopy (TEM) image depicting nickel nanoparticles and carbon nanotubes formed using the multi-solvent method, in accordance with one or more embodiments of the present disclosure.
Figure 5A:
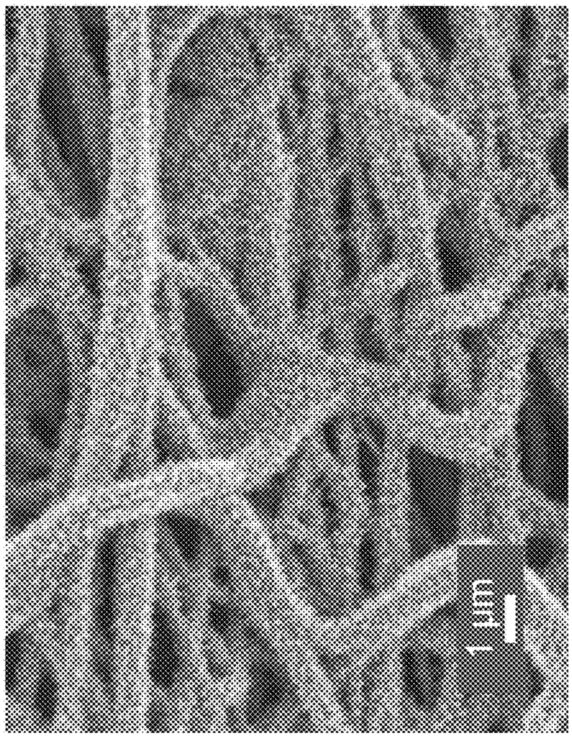
FIG. 5A is an SEM image depicting nickel carbon nanotubes formed using the multi-solvent method, in accordance with one or more embodiments of the present disclosure.
Figure 5D:
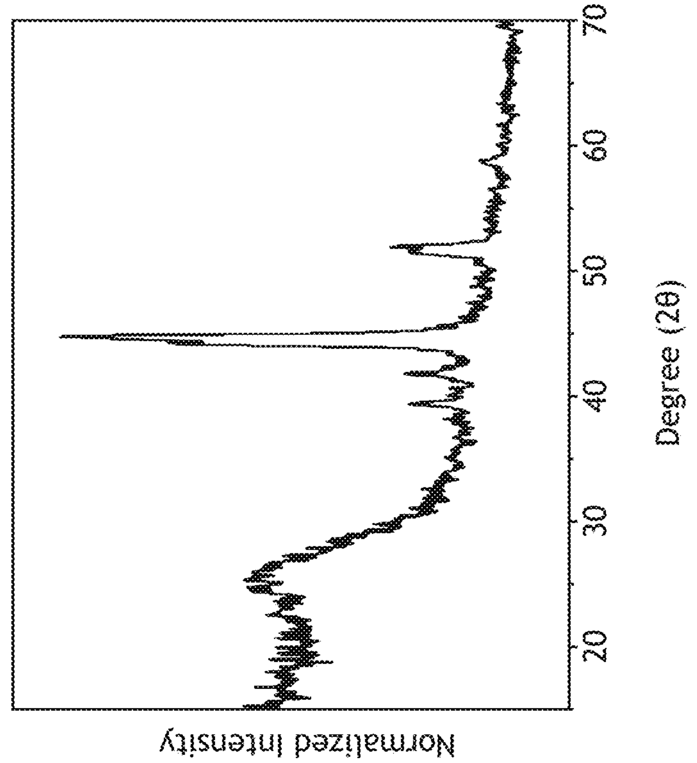
FIG. 5D is an XRD graph depicting nickel nanoparticles and carbon nanotubes formed using the multi-solvent method, in accordance with one or more embodiments of the present disclosure.
Figure 5C:
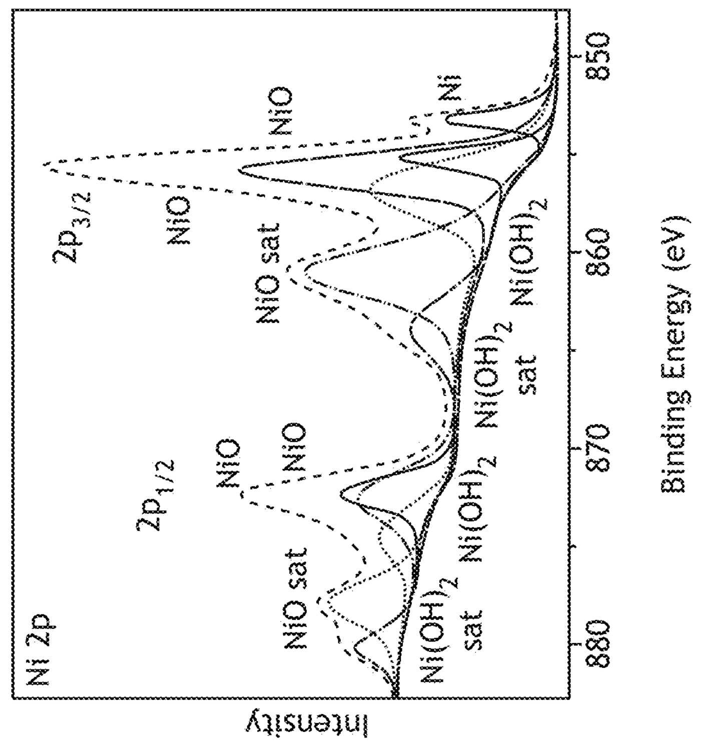
FIG. 5C is an XPS graph depicting nickel nanoparticles and carbon nanotubes formed using the multi-solvent method, in accordance with one or more embodiments of the present disclosure.

FIGS. 5A-5D illustrate nickel nanoparticles and carbon nanotubes formed using the dual-solvent method of present disclosure. FIG. 5A depicts an SEM image 500 of the nickel nanoparticles and carbon nanotubes formed using the dual-solvent method of present disclosure. FIG. 5B depicts an TEM image 510 of the nickel nanoparticles and carbon nanotubes formed using the dual-solvent method of present disclosure. FIG. 5C depicts an XPS graph 520 of the nickel nanoparticles and carbon nanotubes formed using the dual-solvent method of present disclosure. FIG. 5D depicts an XRD graph 530 of the nickel carbon nanofibers formed using the dual-solvent method of present disclosure.

For example, as shown in FIG. 5A, the dual-solvent method implemented with nickel nitrate may yield a dense CNT jungle enveloping the carbon fiber. It is contemplated that the decomposed hexane serves as the hydrocarbon source for CNT growth, while the formed nickel nanoparticles (e.g., 11.1±2.4 nm sized nanoparticles) demonstrate the required carbon solubility and activity to catalyze tip-mediated growth of multi-walled CNTs. Tip mediated growth signifies a relatively weak interaction between the molten nickel droplet and the carbon fiber substrate; decomposed hydrocarbon products diffuse from the metal droplet to the carbon fiber, pushing it off of the substrate as CNTs grow. For example, as shown in FIG. 5D, the XRD graph 530 depicts the formation of metallic nickel nanoparticles, even revealing the metastable hexagonal closed packed (hcp) crystal structure accompanying the metallic fcc structure. It is noted that the hcp phase of nickel has only been shown to form with the aid of capping agents or under rapid temperature quenching conditions, such as solvent-assisted laser ablation and liquid quenching. This further substantiates the claim that rapid thermal quenching is occurring in the dual-solvent method of the present disclosure.

It is contemplated herein that the system and method of the present disclosure provide a reaction environment that favors the kinetic metastable hcp phase over the thermodynamic fcc phase by means of rapid temperature swing. For example, as shown in FIG. 5D, the graph 530 depicts metallic fcc peaks appear at 44.7° 2θ, corresponding to the reflection (111), and 51.6° for the reflection (200). Further, the graph 530 depicts the hcp peaks at 39.4° (010), 41.8° (002), 44.2° (011), and 58.8° (012).

FIG. 5C depicts a XPS graph 530 depicting metallic peaks with oxidation features, similar to that of the copper sample. Ni $2p_{3/2}$ shows a distinctive nickel metal peak at 852.73 eV along with NiO at 854.81 eV and 855.48 eV, and $Ni(OH)_2$ at 856.38 eV, with the satellites at 860.91 eV and 864.00 eV, respectively. $2p_{1/2}$ appears at 872.84 eV and 872.97 eV for NiO as well as the $Ni(OH)_2$ peak at 875.11 eV; again, satellites appear at 878.74 eV and 881.15 eV.

Figures 6A, 6B:
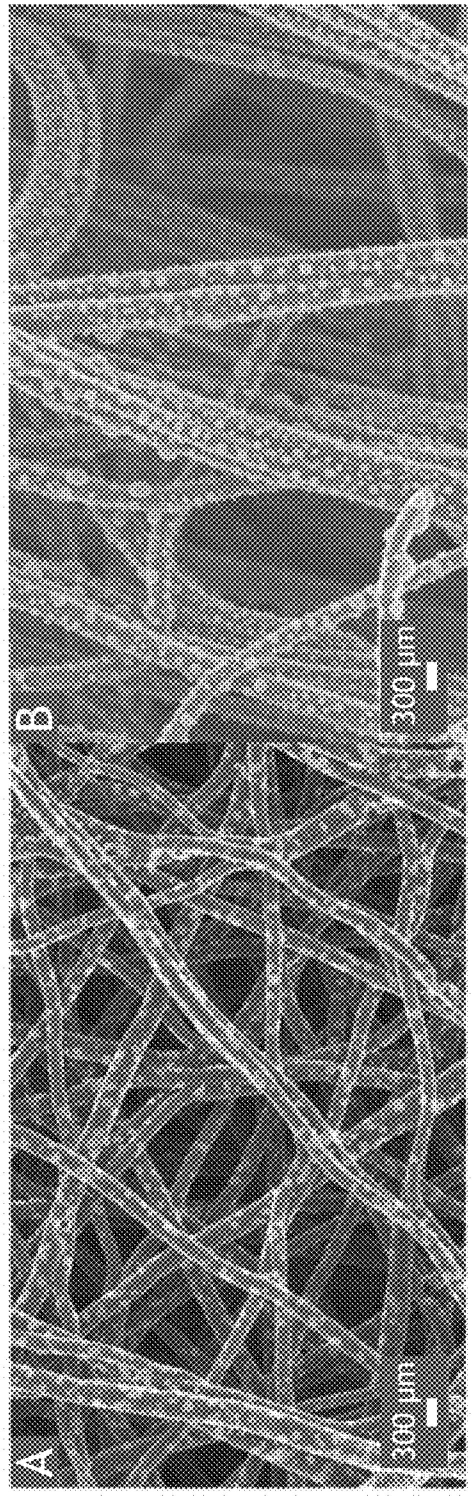
FIG. 6A is an SEM image depicting copper nanoparticles formed using a dry single-solvent method, in accordance with one or more embodiments of the present disclosure.
FIG. 6B is an SEM image depicting copper nanoparticles formed using a wet single-solvent method, in accordance with one or more embodiments of the present disclosure.

Referring to FIGS. 6A-6B, SEM images 600, 610 depict copper nanoparticles on carbon nanofiber mats. In particular, FIG. 6A is an SEM image 600 depicting a Cu-CNF mat (110.00±14.4 nm) fabricated using a dry single-solvent method. Further, FIG. 6B is an SEM image 610 depicting a Cu-CNF mat (117±56.8 nm) fabricated using a wet single-solvent method. As shown and previously described herein, the presence of the solvent in the wet single-solvent method decreases the interparticle distance. For example, as shown in FIG. 6B, the interparticle distance (or spacing) of the spherical nanoparticles formed was approximately 50-150 nm.

A carbon nanofiber mat was dipped into ethanolic 0.05M copper nitrate solution and allowed to dry in air. The composite precursor was subjected to microwave Joule heating for 1 s under nitrogen to allay sample burning. After heating, the mat was rinsed with ethanol to remove any excess salts. SEM images of the resulting composite showed aspherical aggregates of size 110.0±14.4 nm and larger interparticle distances ranging from 100-300 nm, as shown in FIG. 6A. The produced nanoparticles are much larger than those prepared by the literature carbothermal shock copper method, of size 56.8±7.3 nm, using direct contact electrodes under dry, inert atmosphere and well-defined 55 ms heating pulse time. As such, it is contemplated that the lack of precise temporal power control, limited to about 1 second using the conventional microwave, led to excessive heating times that resulted in exhaustion of surface oxygen and subsequent coarsening of nanoparticles.

Given this observation, it is contemplated that the introduction of suitable liquid to the system during Joule heating could alter the heat transfer mechanisms and provide smaller, well dispersed nanoparticles. The cooling rate of the composite can be controlled by the solvent, exhibiting a rapid quenching mechanism rather than simple heat conduction to air. Following termination of microwave irradiation, the carbon fiber temperature decreases until cooling by film boiling is no longer thermally sustained. The solvent will reach the surface to further quench the temperature by transition boiling. Rapid thermal quenching has been shown to halt nanoparticle growth and sintering to reduce resultant nanoparticle diameter and homogenize size distribution. The rapid temperature drop ceases Brownian motion, thereby inhibiting nanoparticle growth and migration.

Figure 7B:
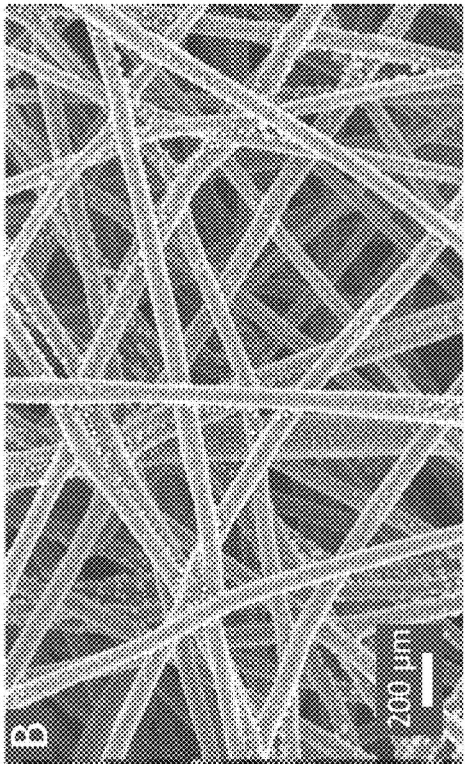
FIG. 7B is an SEM image depicting copper nanoparticles formed using a wet dual-solvent method, in accordance with one or more embodiments of the present disclosure.
Figure 7A:
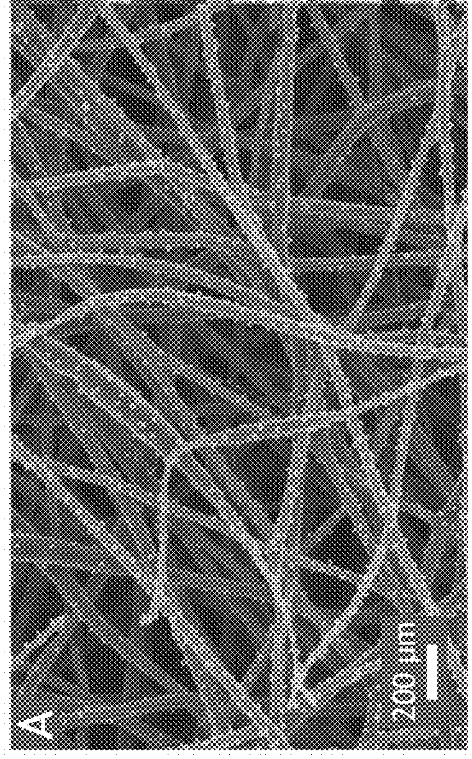
FIG. 7A is an SEM image depicting copper nanoparticles formed using a dry dual-solvent method, in accordance with one or more embodiments of the present disclosure.

Referring to FIGS. 7A-7B, SEM images 700, 710 depict copper nanoparticles on carbon nanofiber mats. In particular, FIG. 7A is an SEM image 700 depicting a Cu-CNF mat (41.7±4.9 nm) fabricated using a dry dual-solvent method. Further, FIG. 7B is an SEM image 710 depicting a Cu-CNF mat (15.4±4.8 nm) fabricated using a wet dual-solvent method. As shown and previously described herein, the presence of the wet solvent during heating affects small, dispersed nanoparticle morphology.

Due to the inability of hexane to dissolve the metal nitrate salts, a dual-solvent system was chosen to further study the influence of liquids on the metal nanoparticle morphology. The mat was first dipped into the 0.05M ethanolic copper nitrate solution, and then transferred to the reaction vessel with an excess of miscible hexane to serve as the liquid. Microwave Joule heating resulted in small, spherical nanoparticles of size 15.4±4.8 nm and interparticle spacing of <20 nm, as shown in FIG. 7B. The nanoparticles prepared by the wet dual-solvent method, as shown in FIG. 7B, showed a remarkable improvement in dispersed coverage on the nanofiber support over the wet single-solvent method, 117±56.8 nm, shown in FIG. 6B. The dispersed nanoparticles formed using the wet dual-solvent method of the present disclosure were found to be even smaller than the literature carbothermal shock nanoparticles of size 56.8±7.3 nm.

It is contemplated that the small nanoparticle size may be attributed to fission mediated by the carbon metabolism reaction, and rapid temperature quenching to halt particle growth. The result indicates that the presence of liquid should afford rapid cooling to yield small nanoparticles. As such, the larger nanoparticles of the single-solvent procedure, where the single-solvent method feeds additional reagent from solvent to the support surface, indicate that concentration may play significant role in the resulting morphology.

Figures 8A, 8B, 8C, 8D:
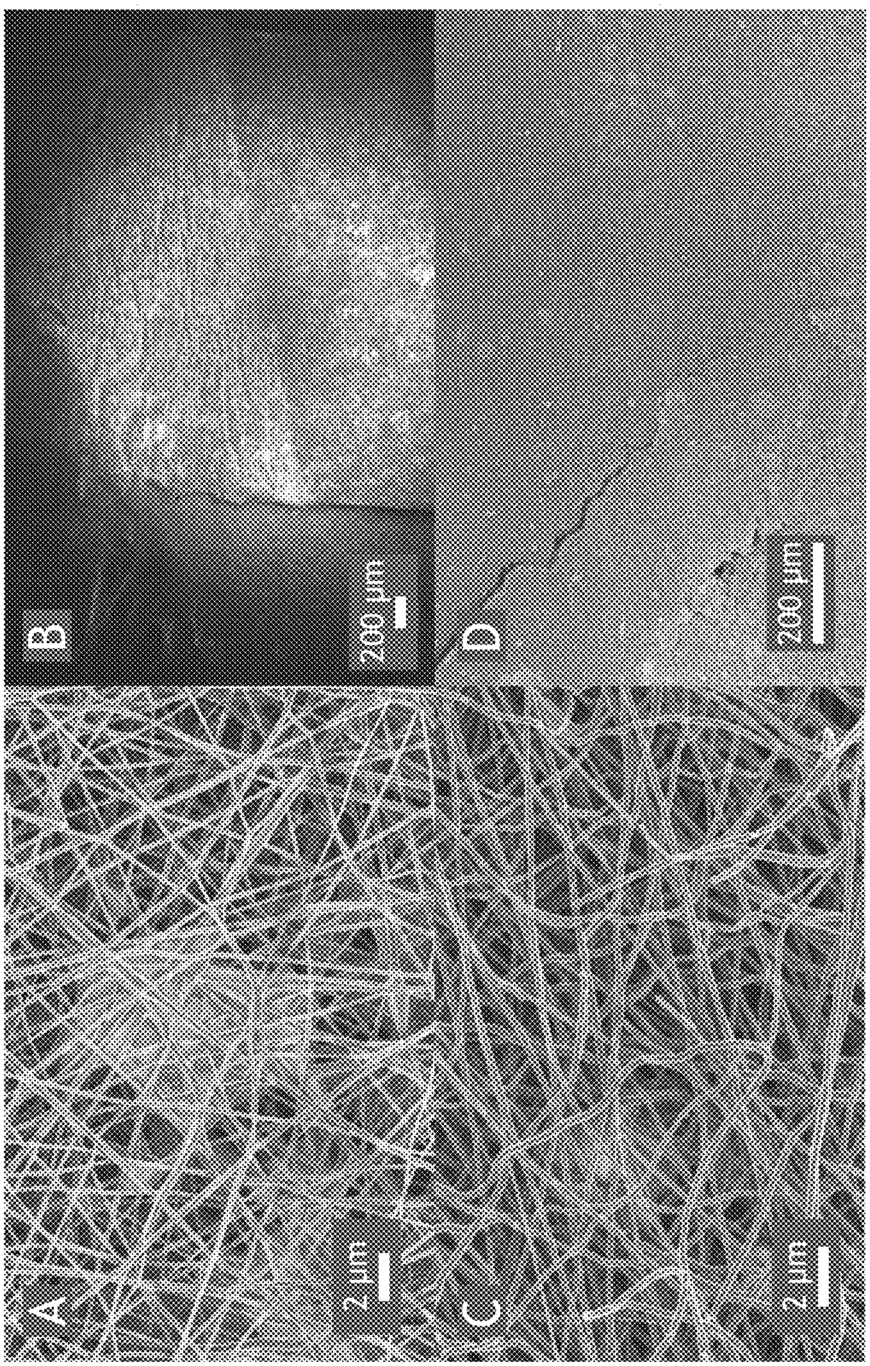
FIG. 8A is an SEM image depicting carbon fibers dried using air before microwave treatments showing metal salt aggregates, in accordance with one or more embodiments of the present disclosure.
FIG. 8B is an SEM image depicting carbon fibers dried using air before microwave treatments showing metal salt aggregates, in accordance with one or more embodiments of the present disclosure.
FIG. 8C is an SEM image depicting carbon fibers dried using hexane before microwave treatments showing that much less metal salt aggregates, in accordance with one or more embodiments of the present disclosure.
FIG. 8D is an SEM image depicting carbon fibers dried using hexane before microwave treatments showing that much less metal salt aggregates, in accordance with one or more embodiments of the present disclosure.

FIGS. 8A-8D illustrate SEM images of carbon nanofibers dried using various techniques and before microwave heating was applied. FIGS. 8A-8B illustrate SEM images 800, 810 of a CNF dipped into 0.05M $Ni(NO_3)_2$ in EtOH and dried using air. FIGS. 8C-8D illustrate SEM images 820, 830 of a CNF dipped into 0.05M $Ni(NO_3)_2$ in EtOH and dried using hexane. It is noted that white contrasted areas in the SEM images indicate charged dried salt.

As previously discussed herein, since hexane is miscible with ethanol, but cannot dissolve the metal nitrate salt, an antisolvent-precipitation phenomenon will occur to deposit salt onto the nanofiber support. In comparison to the single-solvent procedure, no additional reagent from the solvent will be provided to the support surface. Given that the two procedures (dried air v. hexane) deposit an equal amount of metal nitrate salt, this result clearly indicates that the presence of liquid is a considerable factor in nanoparticle morphology. As such, it was observed that solvent affects rapid thermal quenching to temperatures low enough to halt nanoparticle growth and coalescence migration to result in small, well-dispersed nanoparticles deposited onto the carbon fiber support. In particular, it was observed that the hexane treatment may reduce the aggregation of metal salts. These observations show the vital role of the solvent to change the cooling mechanism, especially given the limited temporal control of the conventional microwave.

Figures 9A, 9B, 9C, 9D:
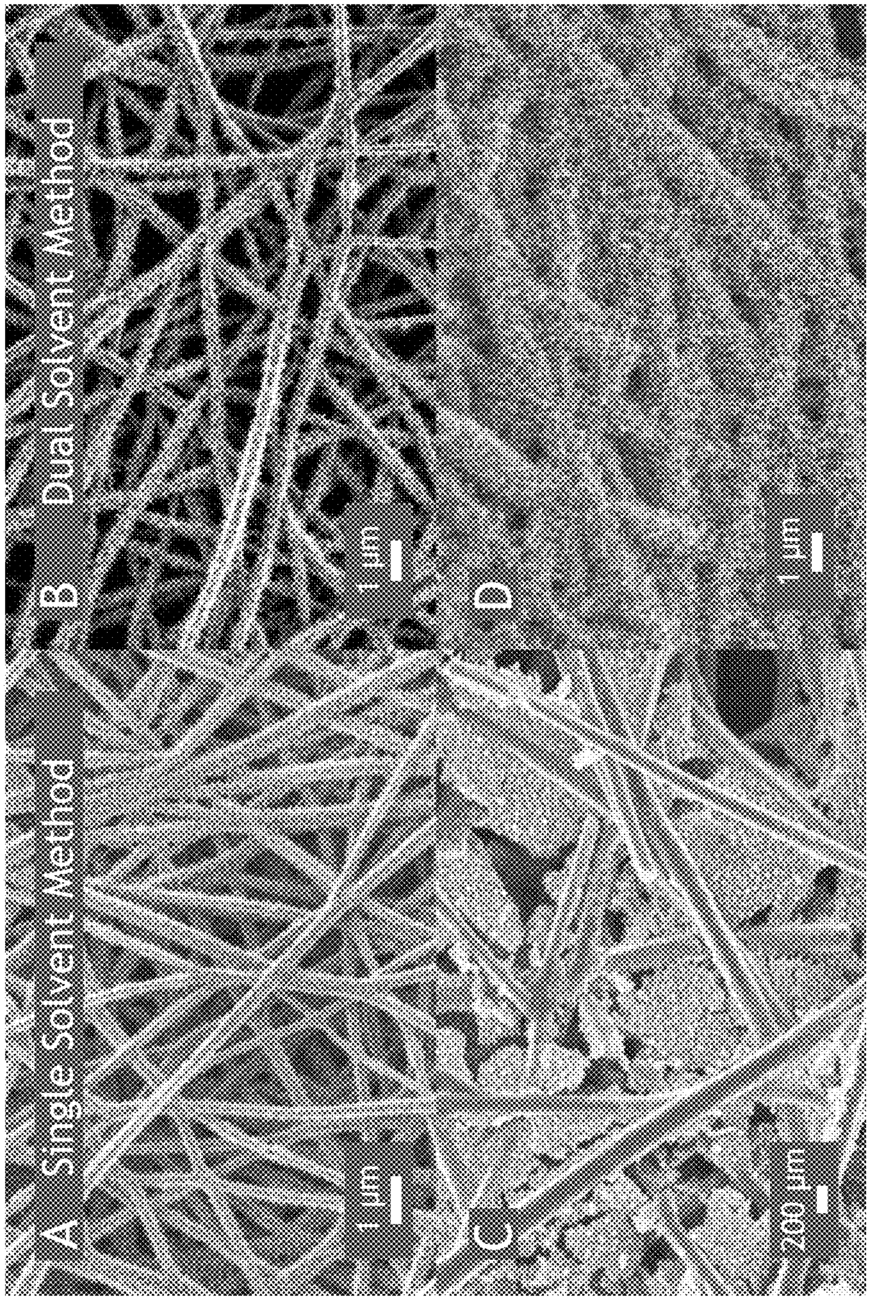
FIG. 9A is an SEM image depicting nickel nanoparticles formed using a wet single-solvent method, in accordance with one or more embodiments of the present disclosure.
FIG. 9B is an SEM image depicting nickel nanoparticles formed using a wet dual-solvent method, in accordance with one or more embodiments of the present disclosure.
FIG. 9C is an SEM image depicting nickel nanoparticles formed using a wet single-solvent method, in accordance with one or more embodiments of the present disclosure.
FIG. 9D is an SEM image depicting nickel nanoparticles and carbon nanotubes formed using a wet dual-solvent method, in accordance with one or more embodiments of the present disclosure.

FIGS. 9A-9D illustrate SEM images 900-930 depicting nickel nanofiber mats. In particular, FIGS. 9A-9B are SEM images 900, 910 depicting a Ni-CNF mats fabricated using a wet single-solvent method and dual-solvent method, respectively, including 0.05M nickel nitrate. Further, FIGS. 9C-9D are SEM images 920, 930 depicting a Ni-CNF mats fabricated using a wet single-solvent method and dual-solvent method, respectively, including 0.20M nickel nitrate.

Nickel was observed to exhibit more drastic changes in morphology during the single-solvent control experiments. The comparison of dual to single-solvent methods shows little difference between the two at a lower concentration of 0.05M nickel nitrate, where both form homogeneous nanoparticles with accompanying CNTs, as shown in FIGS. 9A-9B. However, the higher 0.2M concentration experiments show a stark contrast. The dual-solvent method extends the perpendicular growth of the CNT forest on the fiber from 440±61 nm using the lower 0.05M concentration up to 1060±151 nm when using 0.2M concentration, as shown in FIGS. 9C-9D. A single-solvent control at 0.2M exhibits extensive metal aggregation, rather than CNT growth, as shown in FIG. 9C. The observed modulation is due to the chemical properties of the nickel nanoparticles, including greater solubility of carbon and superior activity towards CNT catalysis. With the excess of hexane vapor there are sufficient carbonaceous species present to favor CNT catalysis over agglomeration.

Figure 10:
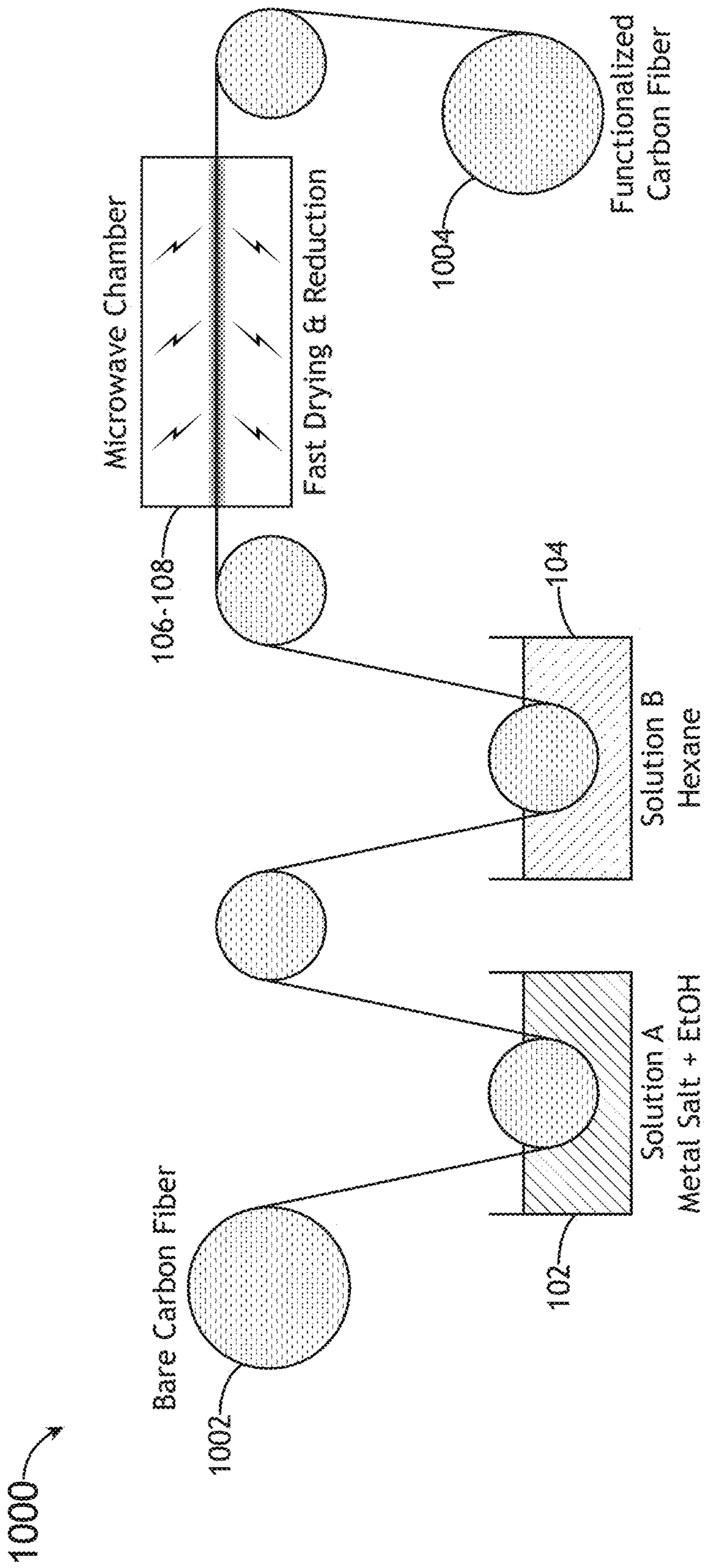
FIG. 10 is a schematic view of a roll-to-roll manufacturing process including the system and method as shown in FIGS. 1-2, in accordance with one or more embodiments of the present disclosure.

FIG. 10 is a schematic view of a roll-to-roll carbon fiber manufacturing process 1000 implementing the multi-solvent system and method shown in FIGS. 1-2, in accordance with one or more embodiments of the present disclosure.

The system and method disclosed herein may be readily added to existing roll-to-roll carbon fiber manufacturing process, as shown in FIG. 1000. For example, the antisolvent precipitation technique previously described herein (e.g., steps 102-104 described above with respect to FIGS. 1-2) may be used with bare carbon fibers 1002, which are arranged on rotatable members, to precipitate metal salt crystals over the bare carbon fibers and maintain wet fibers. Following the antisolvent precipitation technique, microwave carbothermal shock (e.g., steps 106-108 described above with respect to FIGS. 1-2) may be used to produce metal nanoparticles and then later produce functionalized carbon fiber 1004.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method, the method comprising:

coating a substrate with a solution, the solution including one or more metal salts and a first solvent, the one or more metal salts configured to dissolve in the first solvent;

adding a second solvent to the coated substrate until one or more metal salt crystals precipitate over a surface of substrate, the second solvent including an antisolvent where the one or more metal salts of the solution are insoluble in the second solvent; and performing a microwave heating process to apply microwave heat to the substrate while the second solvent is present to induce thermal decomposition of the one or more metal salts until one or more metal nanostructures are formed on the surface of the substrate.

2. The method of claim 1, wherein the one or more metal nanostructures are spherical in shape.

3. The method of claim 1, wherein the one or more metal nanostructures are less than 50 nm.

4. The method of claim 1, wherein the one or more metal nanostructures have an interparticle distance between 15 nm and 100 nm.

5. The method of claim 1, further comprising:

quenching the one or more metal nanostructures formed on the surface of the substrate using at least one of the first solvent or the second solvent.

6. The method of claim 5, wherein the one or more metal nanostructures are quenched using a hexane solvent.

7. The method of claim 1, wherein the one or more metal nanostructures include at least one of:

one or more metal nanoparticles, one or more nano flakes, or one or more metal nanorods.

8. The method of claim 1, wherein the substrate includes a carbon-based substrate.

9. The method of claim 8, wherein the carbon-based substrate includes carbon fibers.

10. The method of claim 1, wherein the first solvent includes ethanol.

11. The method of claim 1, wherein the second solvent includes hexane.

12. The method of claim 11, wherein the hexane is contained within a reservoir, wherein the reservoir is 3 mm deep and contains 0.1 mL of the hexane.

13. The method of claim 1, wherein the one or more metal salts include at least one of:

nickel, cobalt, or copper.

14. The method of claim 1, wherein the microwave heating process includes a microwave carbothermal heat shock process.

15. The method of claim 9, wherein the microwave heat is applied to the substrate and the one or more metal salt crystals for a predetermined amount of time.

16. The method of claim 15, wherein the predetermined amount of time is five seconds.

17. The method of claim 16, wherein the predetermined amount of time includes three seconds of induction heating and two seconds of Joule heating.

* * * * *